United States Patent [19]
Yamamoto

[11] Patent Number: 5,095,180
[45] Date of Patent: Mar. 10, 1992

[54] DEVICE FOR DETERMINING POSITION COORDINATES

[75] Inventor: Akira Yamamoto, Tokyo, Japan

[73] Assignee: Graphtec Kabushiki Kaisha, Tokyo, Japan

[21] Appl. No.: 668,781

[22] Filed: Mar. 13, 1991

[30] Foreign Application Priority Data

Sep. 21, 1990 [JP] Japan ................................ 2-250241
Sep. 26, 1990 [JP] Japan ................................ 2-254339
Oct. 12, 1990 [JP] Japan ................................ 2-272185

[51] Int. Cl.$^5$ ............................................. G08C 21/00
[52] U.S. Cl. .................................................... 178/19
[58] Field of Search ...................................... 178/19, 18

[56] References Cited

U.S. PATENT DOCUMENTS

| | | | |
|---|---|---|---|
| 4,697,059 | 9/1987 | Furukawa | 219/69 W |
| 4,795,858 | 1/1989 | Yamazaki | 178/19 |
| 4,878,553 | 1/1989 | Yamazaki | 178/18 |
| 4,988,837 | 1/1991 | Murakami et al. | 178/19 |

Primary Examiner—Stafford D. Schreyer
Attorney, Agent, or Firm—Price, Heneveld, Cooper, DeWitt & Litton

[57] ABSTRACT

In a cordless digitizer comprising a tablet, a cursor, and a signl processor, a power-supply grid structure (or structures) is provided in the tablet, and a power-supply frequency coupling coil is equipped in the cursor. The electric power to the cursor is supplied through electromagnetic coupling between the power-supply grid structure and the power-supply frequency coupling coil. The attribute of the point indicated by the cursor is conveyed by a binary code from the cursor to the signal processor.

4 Claims, 10 Drawing Sheets

DEVICE FOR DETERMINING POSITION COORDINATES

BACKGROUND OF THE INVENTION

The present invention relates to a device for determining position coordinates of a cursor on a tablet by detecting eletromagnetic induction between the cursor coil and the grid-shaped conductors formed in the grid structures of the tablet, and in particular to a cordless type digitizer in which a cable for transmitting electric signals between the cursor and the tablet is eliminated.

As a prior art of this invention, there is a U.S. Pat. No. 4,795,858 entitled "Device for Determining Position Coordinates of Points on a Surface" possessed by the applicant of the present invention.

In this prior art, the cursor has a battery for supplying electric power to electric circuits in the cursor. An alternating current generated by these electric circuits, flows in a cursor coil and generates an electromagnetic field on the tablet. This electromagnetic field induces electric voltages in the grid-shaped conductors in the grid structures.

These induced voltages in the grid-shaped conductors are processed in a processor to determine the position coordinates of the cursor on the tablet.

In this device of the prior art, however, the power consumption in the cursor is fairly large and the battery of the cursor must be recharged or renewed rather frequently.

In some applications of a digitizer, in addtion to the coordinates of a point, an attribute (or attributes) of the point is sometimes necessary. For example, an attribute of a point specifies a colour to display the coordinates of the point on a cathode ray tube display.

In a prior art which is disclosed in a U.S. Pat No. 4,697,050, this attribute is represented by the frequency of the alternating current in the cursor coil. But, in such a design, a variety of tuning circuits must be provided in the cursor for generating a variety of frequencies, and in the signal porcessor for tuning to the frequencies. When a relatively large number of attributes, say 16 different attributes, are to be indentified, this method of frequency distinction will be impractical.

SUMMARY OF THE INVENTION

Therefore, the primary object of this invention is to provide a cordless digitizer, in which the power-supply for the cursor is not a battery. For this object, the cursor of this invention is power-supplied by magnetic induction from the tablet.

In general, in a tablet of a device for determining position coordinates, there are two types of grid structures; in the one type, the length of the grid-shaped conductor pattern being in parallel to the Y-axis and the conductors being arranged along the X-axis for determining the position coordinate in the X-axis (hereafter will be called Y-directional conductor pattern), and in the other type, the length of the conductor pattern being in parallel to the X-axis and the conductors being arranged along the Y-axis for determining the position coordinate in the Y-axis (hereafter will be called X-directional conductor pattern).

And in some types of digitizers, the Y-directional conductor pattern has polyphase spaced windings along the X-axis, and the X-directional conductor pattern has polyphase spaced windings along the Y-axis. When a polyphase alternating current flows in a polyphase spaced windings in a grid structure, a uniform amplitude magnetic field is generated on the surface of the tablet.

And therefore, in such types of digitizers, during the time when a Y-directional conductor pattern is used for determining a position coordinate, the polyphase spaced windings of a X-directional conductor pattern can be excited by a polyphase alternating current for producing a uniform magnetic field on the table, and during the time when a X-directional conductor pattern is used for determining a position coordinate, the polyphase spaced windings of a Y-directional conductor pattern can be excited by the polyphase alternating current for producing the uniform magnetic field on the tablet.

The cursor of this invention has a power-supply coupling coil in which an alternating-current voltage is induced by the uniform amplitude magnetic field on the tablet. This induced alternating-current voltage is rectified and smoothed to produce a direct-current voltage to be used as the power-supply for the cursor.

In types of digitizers which has no polyphase spaced windings, for example, a position detecting apparatus as disclosed in U.S. Pat. No. 4,878,553, a power-supply grid structure having polyphase spaced windings must be supplemented in the tablet. .

Another object of this invention is to incorporate means for informing attribute data. For this object the current in the cursor coil is modulated by code and this code is decoded in the signal processor to identify the attribute.

These and other objects, features and advantages of the present invention will become clear from the following description of the preferred embodiments in conjunction with the accompanying drawings.

DETAILED DESCRIPTION OF THE PREFERRED EMBODIMENTS

Figure 1:
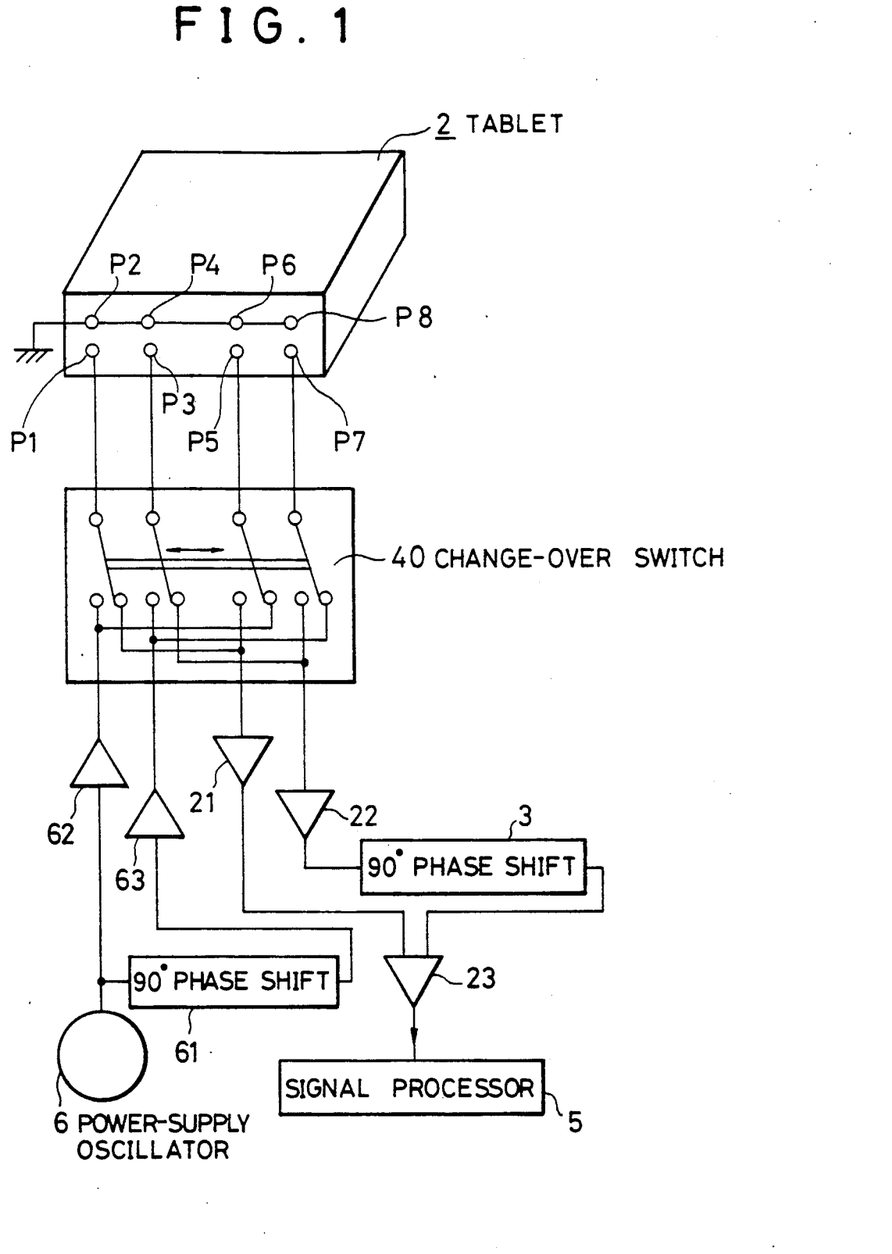
FIG. 1 is a block diagram showing an embodiment of the present invention.

FIG. 1 is a block diagram showing an embodiment of this invention, and 2 is a tablet, 21, 22, 23 are respectively signal frequency amplifiers, 3 is a 90° phase shifter for the signal frequency, 40 is a change-over switch, 5 is a signal processor, 6 is a power-supply oscillator, 61 is a 90° phase shifter for the power-supply frequency, and 62, 63 are respectively power-supply amplifiers.

Figure 2:
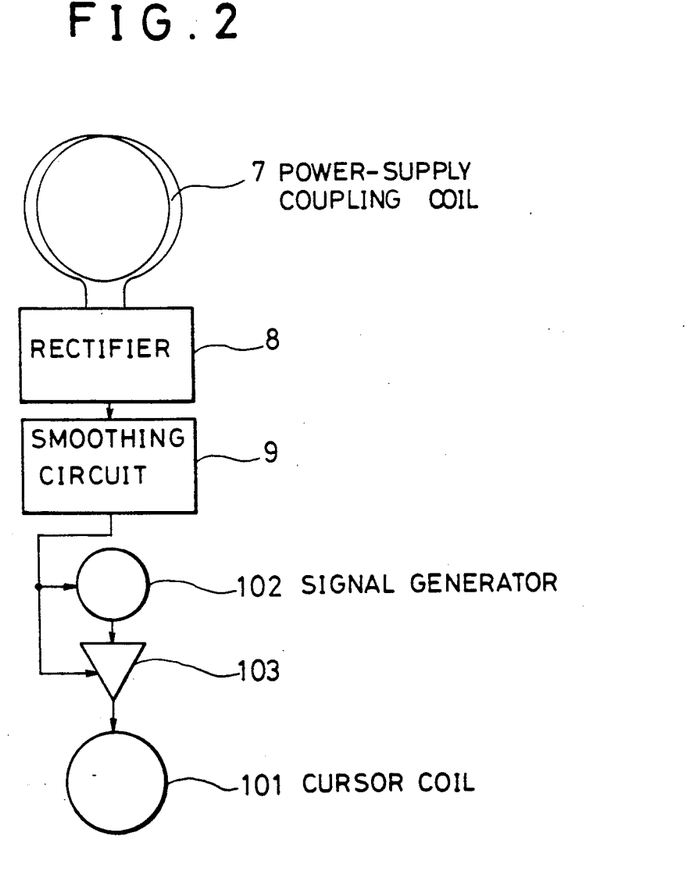
FIG. 2 is a block diagram showing an embodiment of a cursor of the present invention.

The cursor 1 (not shown in FIG. 1) which is to be placed on the tablet is shown in FIG. 2, where 101 is a cursor coil, 102 is a signal generator, 103 is an amplifier, 7 is a power-supply coupling coil, 8 is a rectifier, and 9 is a smoothing circuit.

Figure 4:
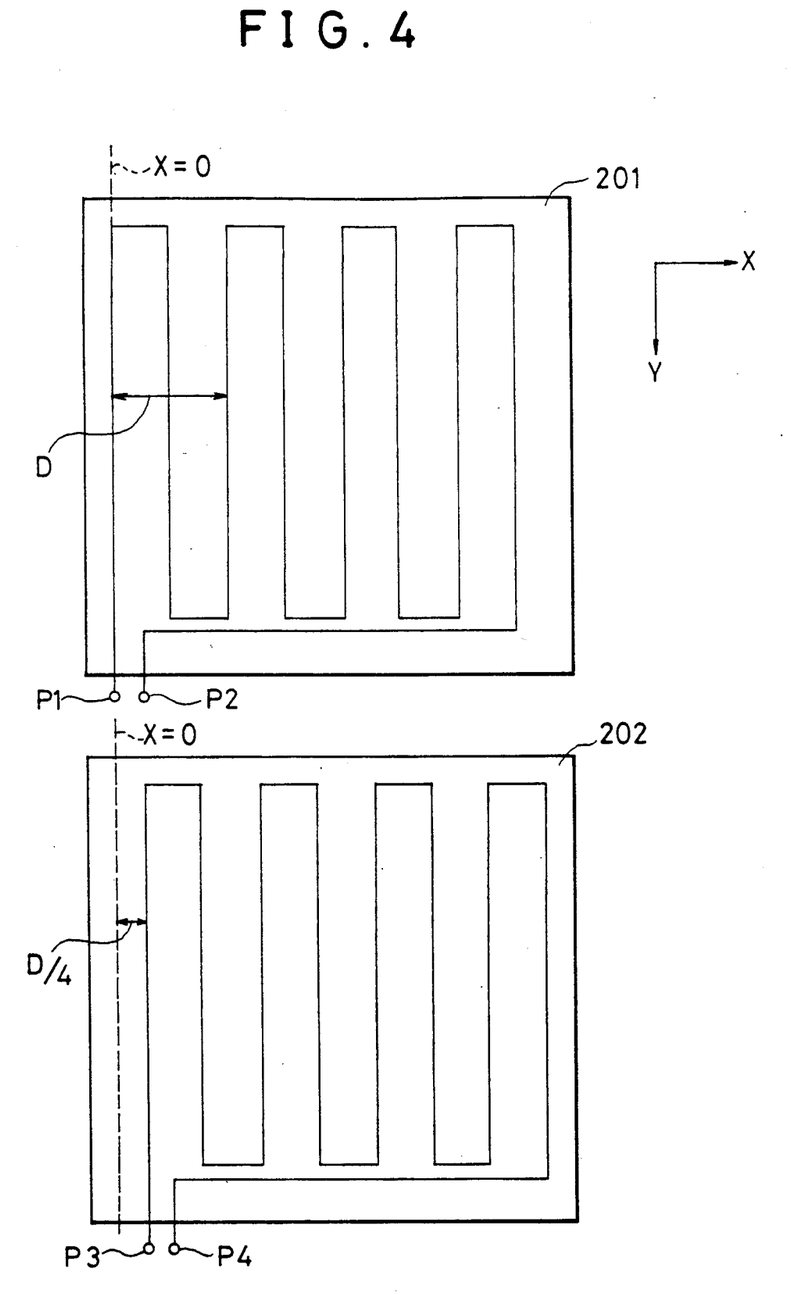
FIG. 4 shows polyphase spaced windings of Y-directional conductor pattern.

FIG. 4 shows grid structures 201 and 202 of the tablet 2. The grid structures 201 and 202 have Y-directional conductor patterns in which the length of the conductor pattern is in parallel to the Y-axis. The pitch of the conductor pattern is D along the X-axis, and the spacing between the two conductor patterns on the grid structures 201 and 202 is D/4.

When the cursor coil 101 is placed at a distance x in the X-axis from a Y-directional conductor of the grid structure 201, and is excited by a signal current of an angular frequency $\omega$, the voltage induced between the terminals P1, P2 will represented by $A\cos 2\pi (x/D) \cdot \sin \omega t$. Similarly the voltage induced between the terminals P3, P4 will be $A\cos 2\pi\{(x-D/4)/D\} \cdot \sin \omega t = A \sin 2\pi(x/D) \cdot \sin \omega t$.

As shown in FIG. 1, the terminals P2, P4 are grounded, the voltage at the terminal P3 is 90° phase-shifted by the phase shifter 3 and added to the voltage at the terminal P1 through the amplifier 23 to produce a signal voltage of $A\sin 2\pi(x/D) \cos \omega t + A\cos 2\pi(x/D) \sin \omega t = A\sin(\omega t + 2\pi x/D)$.

Figure 5:
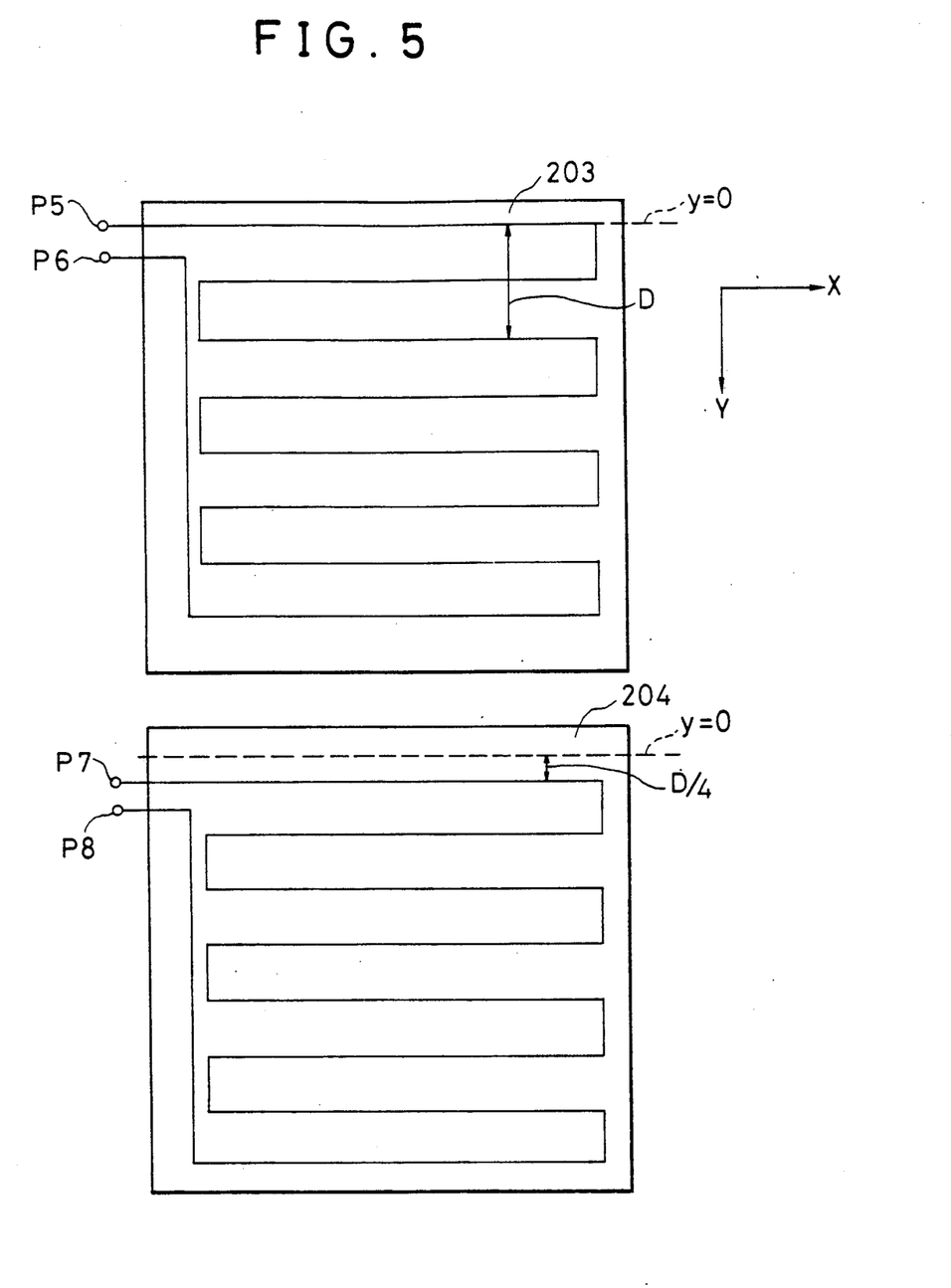
FIG. 5 shows polyphase spaced windings of X-directional conductor pattern.

From the phase angle of $2\pi x/D$ of this voltage, the coordinate position x of the cursor 1 is determined. Similarly, from the voltages induced in Y-directional conductor patterns which are shown in FIG. 5, the coordinate position y of the cursor 1 is determined.

In general, when polyphase spaced windings of Y-directional conductor pattern are used for determining position coordinate in X-axis, grid structures having X-directional conductor pattern are unoccupied and can be used as power-supply grid structure.

At a position of the change-over switch 40 as shown in FIG. 1, the windings from P1 to P2 and from P3 to P4 (refer to FIG. 4) are used for coordinate determination, the winding from P5 to P6 on the grid structure 203 (refer to FIG. 5) is excited by the current from the amplifier 62, and the winding from P7 to P8 on the grid structure 204 is excited by the current from the amplifier 63. When the current from the amplifier 62 is represented by $B\sin \Omega t$, that from the amplifier 63 is represented by $B\cos \Omega t$, where $\Omega$ is the angular frequency of the power-supply voltage. At a point which is in a distance y in the Y-axis from a X-directional conductor, the resultant magnetic field will represented by $$B\cos 2\pi(y/D) \cdot \sin \Omega t + B\cos 2\pi|(y-D/4)/D| \cdot \cos \Omega t = B\sin(\Omega t + 2\pi y/D)$$

This means that the amplitude of the alternating magnetic field is uniform in the direction of the Y-axis. Since the magnetic field produced by a X-directional conductor pattern does not change in the direction of the X-axis, the amplitude of the generated magnetic field is uniform all over the surface of the tablet.

This magnetic field of uniform amplitude induces a constant amplitude voltage in the power-supply coupling coil 7 placed on the surface of the tablet 2. The induced voltage is rectified by the rectifier 8, smoothed by the smoothing circiut 9, and is supplied to the signal generator 102 and the amplifier 103.

In some types of digitizers, there is no grid structure having polyphase spaced windings for coordinate position determination. For such types of digitizers, a power-supply grid structure (OR structures) must be supplement in the tablet 2. The power-supply grid structure to be supplemented in the tablet 2 may consist of a power-supply grid structure of Y-directional conductor pattern as shown in FIG. 4 and a power-supply grid structure of X-directional conductor pattern as shown in FIG. 5. In order to avoid the interference between the signal frequency and the power-supply frequency, when Y-directional conductor pattern is used for coordinate position determination, the power-supply grid structure of X-directional conductor pattern is to be used; and when X-directional conductor pattern is used for coordinate position determination, the power-supply grid structure of Y-directional conductor pattern is to be used.

However, the interference between the power-supply frequency and the signal frequency can be easily avoided by frequency selective circuits, and one power-supply grid structure will be sufficient, when the power-supply frequency is not near to the signal frequency.

Figure 6:
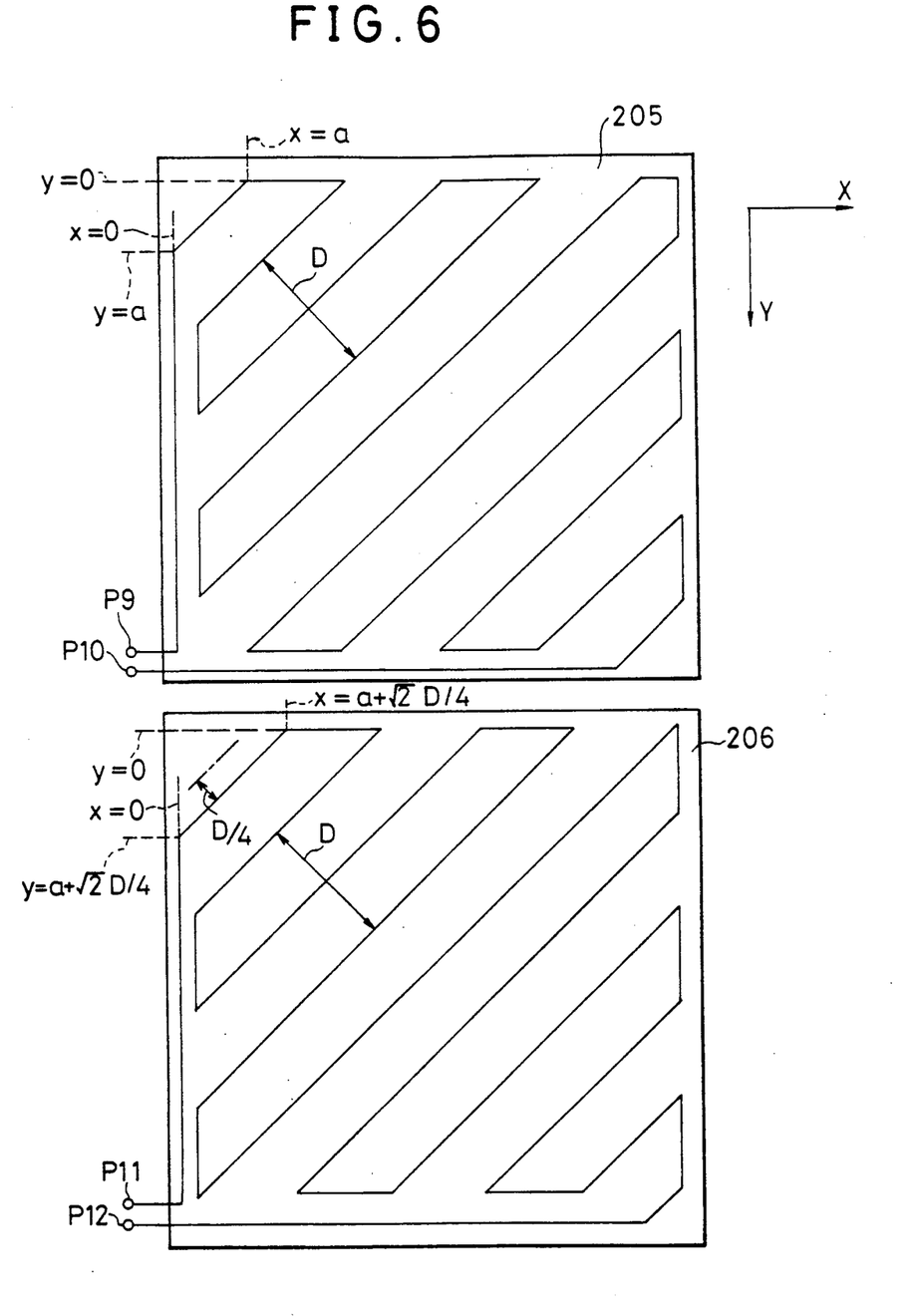
FIG. 6 shows another embodiment of polyphase spaced windings of this invention.

FIG. 6 shows another embodiment of a power supply grid structure. The conductor patterns 205 and 206 have 45°-directional conductor pattern which is oblique either to the X-axis or to the Y-axis. The pitch of the conductor is D in the 45°-direction, and the spacing of the two windings is D/4 as shown in FIG. 6, constituting a polyphased spacing.

In the foregoing descriptions, a 2 phased spacing of a power-supply grid structure, with 2 phase alternating current of a phase difference of 90° is considered. But it is apparent that any polyphased spacing with corresponding polyphase alternating current in a power-supply grid structure can produce a uniform amplitude magnetic field on the tablet.

Figure 3:
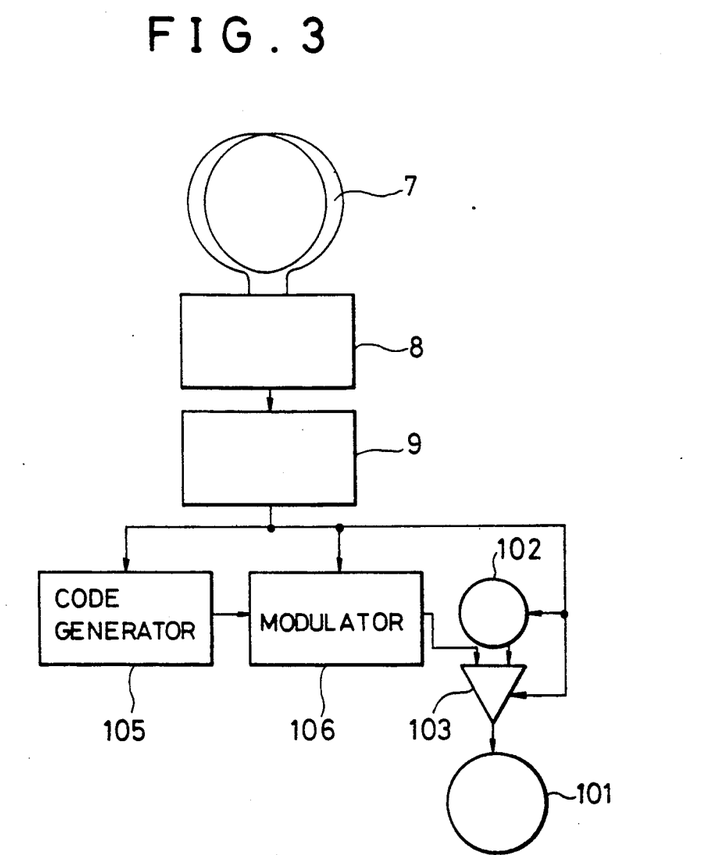
FIG. 3 is a block diagram showing another embodiment of a cursor of the present invention.

In an embodiment of the present invention, the signal voltage is modulated by a binary code. FIG. 3 is a block diagram of a cursor of this invention in which the signal voltage is modulated by a binary code. The same numerals in FIG. 3 indicates the same or the corresponding parts in FIG. 2, and 105 is a code generator and 106 is a modulator.

Figure 7:
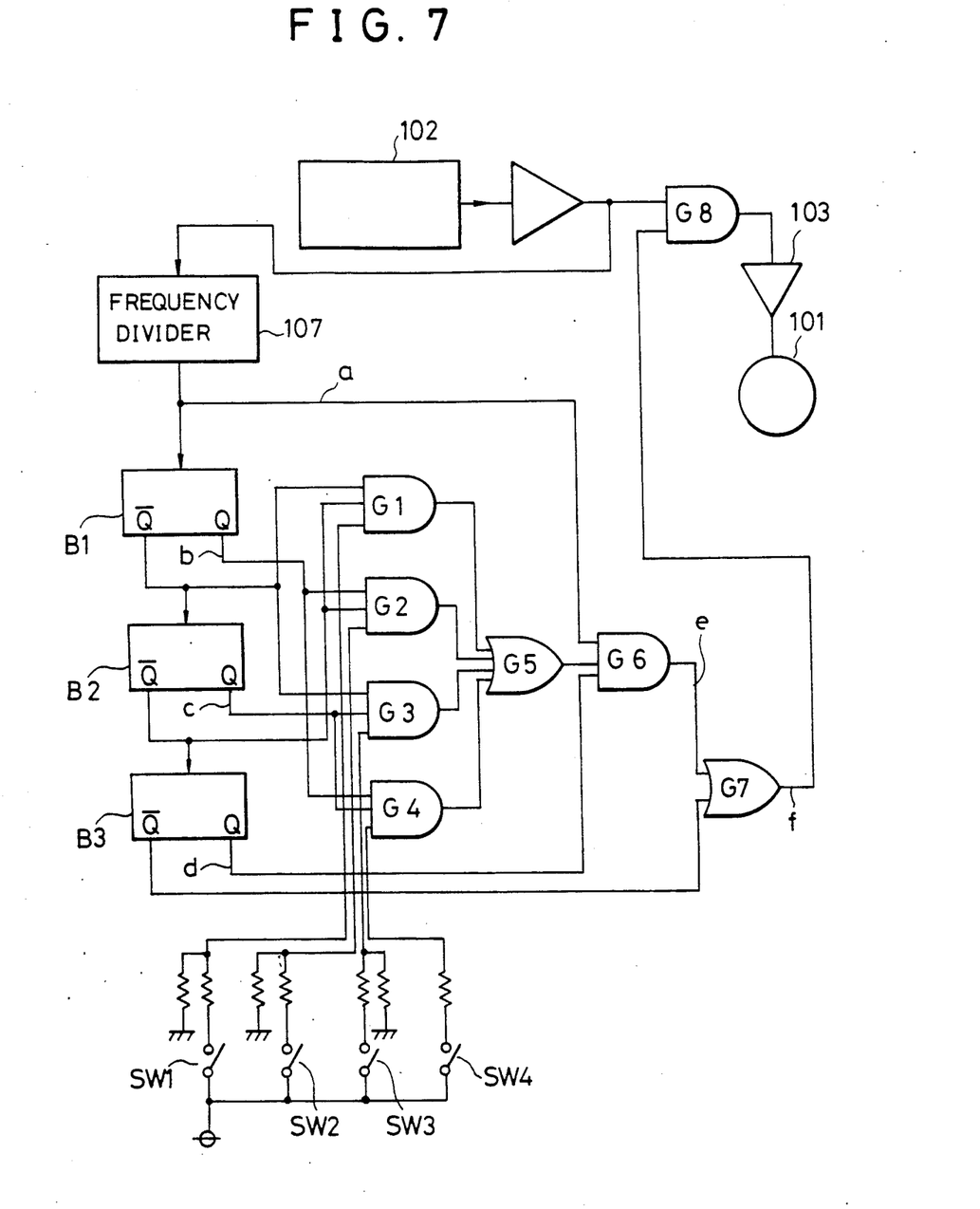
FIG. 7 is a block diagram showing an embodiment of a code modulator of this invention.

An embodiment of the code generator 105 and the modulator 106 is illustrated in FIG. 7. Referring to FIG. 7, the same numerals in FIG. 7 indicates the same or the corresponding parts in FIG. 3, and 107 is a frequency divider, B1, B2, B3 are respectively binary counters, G1, G2, G3, G4, G6, G8 are respectively AND gates, G5, G7 are respectively OR gates. The AND gate G8 is the modulator 106 in FIG. 3. And SW1, SW2, SW3, SW4 are respectively on-off switches.

Figure 8:
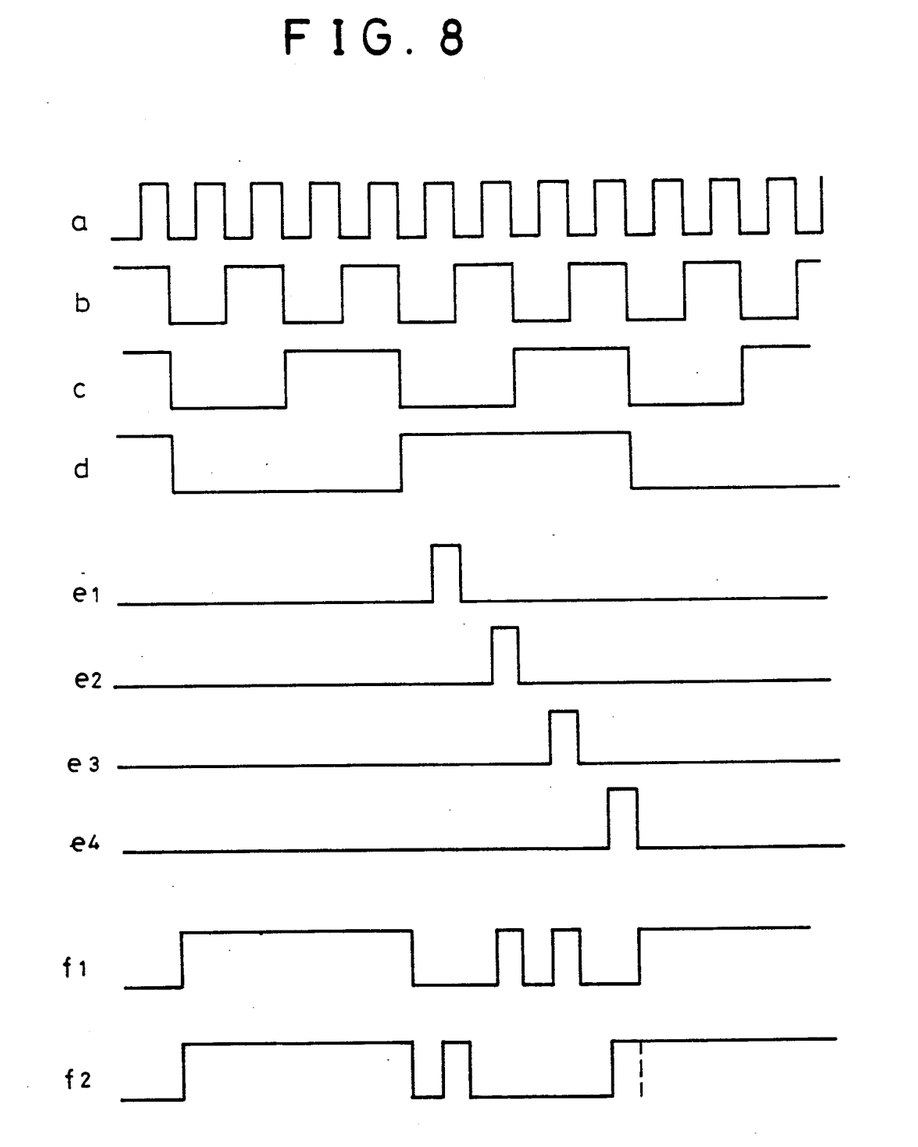
FIG. 8 is a waveform diagram illustrating voltage waveforms in FIG. 7.

FIG. 8 shows voltage waveforms at points a, b, c, d, e, f in FIG. 7. In the embodiment shown in FIG. 7, the rectangular waveform at the point a which is shown by a in FIG. 7, is obtained by dividing the signal frequency of the oscillator 102. But this rectangular waveform voltage can be generated independently of the signal frequency.

As is well known of a binary counter, the voltage waveforms at points b, c, d in FIG. 7 will be as shown by b, c, d in FIG. 8. The gates G1, G2, G3, G4 pass the logic product of two signals b and c corresponding to the closed switch (or switches) of the four switches SW1, SW2, SW3, SW4. The output of the gate G6 is a logical product of the signal a, the signal d and the signal at the output of the gate G5. Therefore, when any one of the four switches SW1, SW2, SW3, SW4 is closed, the waveform at point e in FIG. 7 will be one of the four waveforms e1, e2, e3, e4 in FIG. 8.

When switches, for example, SW2 and SW3 are closed, the waveform at point f in FIG. 7 will be as shown by f1 in FIG. 8, and when switches SW1 and SW4 are closed, the waveform will be as shown by f2 in FIG. 8. Thus, when binary numbers 1, 2, 4, 8 are represented by the closed state of th switches SW1, SW2, SW3, SW4 respectively, the bit pattern of the latter half of the waveform at point f can represent any one of the 16 different attributes.

The front half of the waveform at the point f is used for determining position coordinates and also is used for frame synchronization of the waveform.

Figure 9:
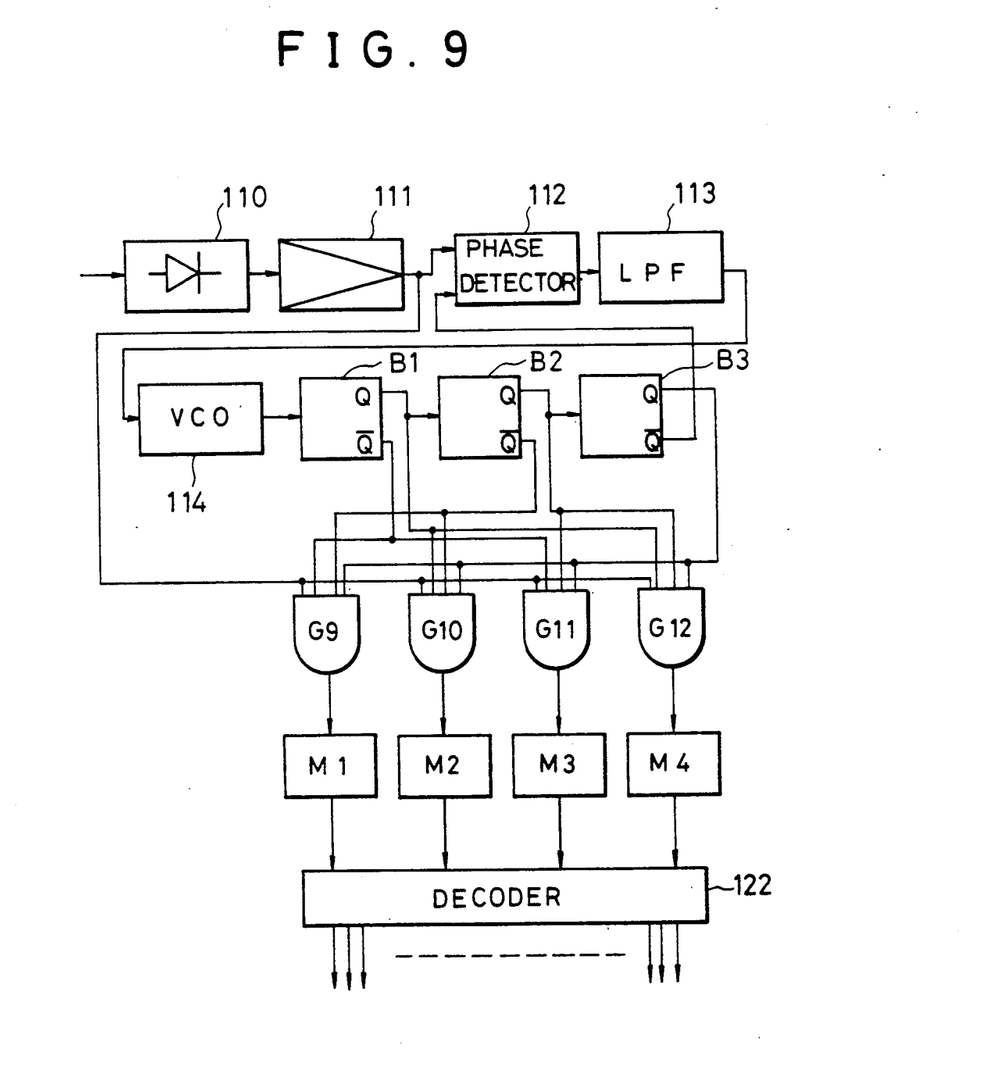
FIG. 9 is a block diagram showing an embodiment of a decoder of this invention.

FIG. 9 is a block diagram illustrating a decoder circuit provided in the signal processor 5 in an embodiment of this invention, and in FIG. 9, 110 is a detector, 111 is an amplifier, 112 is a phase detector, 113 is a low-pass filter, 114 is a voltage controlled oscillator, B1, B2, B3 are binary counters as B1, B2, B3 in FIG. 7, G9, G10, G11, G12 are AND gates respectively, M1, M2, M3, M4 are memories respectively, and 115 is a decoder.

The closed circuit of the oscillator 114-B1-B2-B3-the phase detector112-the filter113-114 constitutes a phase lock loop, and the voltage controlled oscillator 114 generates a voltage having the waveform as shown a in FIG. 8, which is in phase with the output of the detector 110.

The gates G9, G10, G11, G12 correspond to gates G1, G2, G3, G4 in FIG. 7 respectively, and the output of the binary counter B3, which corresponds to the signal d in FIG. 8 also controls these gates G9, G10, G11, G12. Therefore, each gate of these four gates selects corresponding signal from the four signals e1, e2, e3, e4 shown in FIG. 8, and stores the selected signal to a corresponding memory of the four memories M1, M2, M3, M4.

Thus, the bit pattern in the memories M1~M4 represents an on-off pattern of the switches SW1~SW4 in FIG. 7, indicating the kind of the attribute set at the cursor. The decoder 115 decodes the 4 bit binary signal to 16 kinds of attributes.

Figure 10:
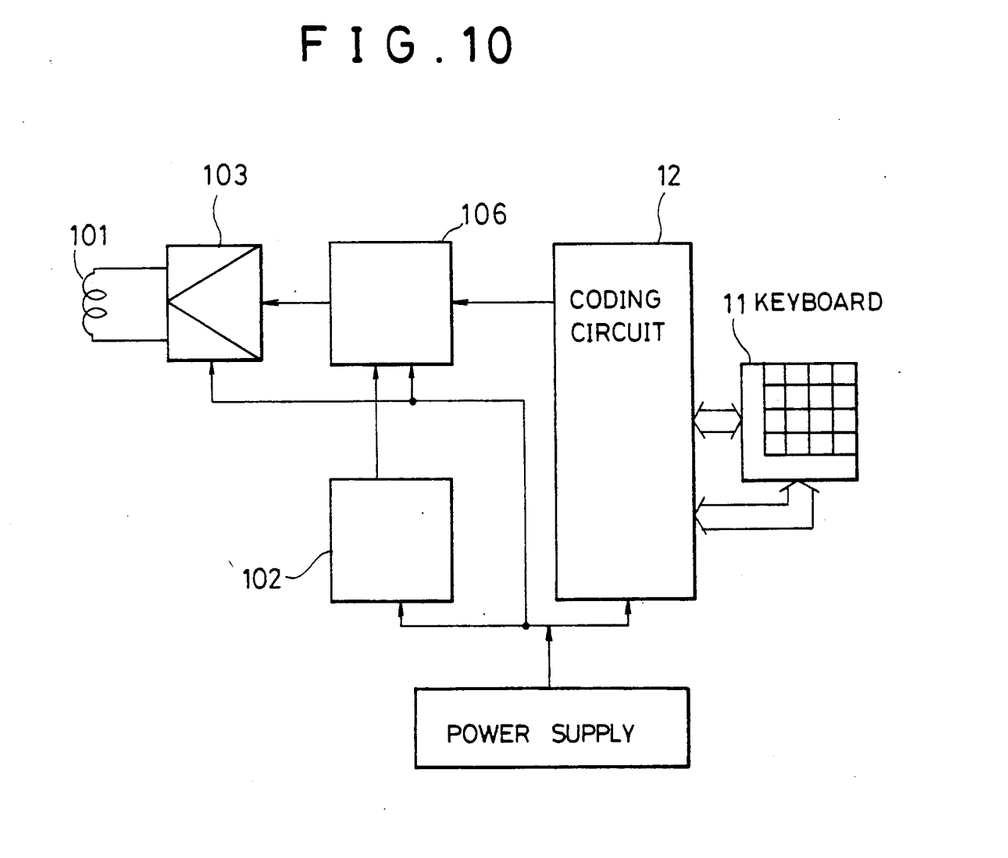
FIG. 10 shows an example of a design of the code modulator shown by FIG. 7.

FIG. 10 shows an example of a design of the code modulator shown by FIG. 7. In FIG. 10, the same numerals indicate the same or the corresponding parts in FIG. 3, and 11 is a keyboard, 12 is a coding circuit. To each pushbutton on the keyboard 11, an attribute is assigned, and 16 different signals from the keyboard 11, representing 16 different kinds of attributes, are encoded to a 4 bit binary signal in the coding circuit 12. The output of the coding circuit 12 corresponds to the output of G7 of FIG. 7.

In the foregoing descriptions, binary 4 bits code is employed. But it is apparent that various types of code are available for this invention, and various types of coders and decoders can be designed in accordance with the type of code employed.

In the embodiment shown by FIG. 3, the modulation by the code is an amplitude modulation. But it is apparent that any other type of modulation may be used for this invention.

I claim:

1. A device for determining position cooridinates comprising: a tablet, a cursor, and a signal processor, said tablet being composed of a pile of plural kinds of grid structures, each grid structure having a grid-shaped conductor pattern (or patterns), said cursor being placed on the surface of said tablet and generating a magnetic field which is coupled to said grid-shaped conductor patterns, said signal processor receiving the voltages induced in said grid-shaped conductor patterns for determining position coordinates of said cursor on the surface of the tablet; characterized in that:

said table contains at least one power-supply grid structure which has conductor patterns arranged in a polyphased spacing and produces a constant amplitude magnetic field on the surface of the tablet when each phase conductor is excited by a corresponding phase current of a polyhphase alternating current;

said cursor is provided with a coupling coil which couples to said constant amplitude magnetic field on the surface of the tablet and induces an alternating-current voltage, and with means for rectifying said induced alternating-current voltage to produce a direct-current voltage to be used as a power-supply for said cursor.

2. A device for determining position cooridinates according to claim 1, where said tablet contains at least one Y-directional conductor pattern in which the length of the conductors is in parallel to the Y-axis and the conductors are arranged in a polyphased spacing along the X-axis for determining the X coordinate of the cursor position, and at least one X-directional conductor pattern in which the length of the conductors is parallel to the X-axis and the conductors are arranged in a polyphased spacing along the Y-axis for determining Y coordinate of the cursor position, where the X-axis and the Y-axis are the axes of coordinates on the surface of said tablet;

characterized in that said signal processor is provided with switching means for connecting a Y-directional conductor pattern as the conductor pattern said power-supply grid structure when a X-directional conductor pattern is used as a conductor pattern for position determination, and connecting a X-directional conductor pattern as the conductor pattern of said power-supply grid structure when a Y-directional conductor pattern is used as a conductor pattern for position determination.

3. A device for determining position coordinates according to claim 1, where said power- supply grid structure has a 45° conductor pattern in which the length of the conductors is in 45° oblique to the X-axis.

4. A device for determining position coordinates according to claim 1, characterized in that:

said cursor is provided with plural switches for setting plural kinds of attributes of the points for which the position coordinates are to be determined, a code generating circuit for generating code patterns corresponding to the setting of said plural switches, and a modulator circuit for modulating said magnetic field generated by the cursor with said generated code patterns;

said signal processor is provided with means for determing the kind of the attributes by detecting the modulating code pattern of the voltage induced in said grid-shaped conductor patterns in the tablet.

* * * * *